Dec. 28, 1954  C. G. PULLIN  2,698,059
HELICOPTER CONTROL SYSTEM
Filed July 8, 1953  5 Sheets-Sheet 1

INVENTOR
Cyril George Pullin
ATTORNEYS

Dec. 28, 1954    C. G. PULLIN    2,698,059
HELICOPTER CONTROL SYSTEM
Filed July 8, 1953    5 Sheets-Sheet 2

INVENTOR
Cyril George Pullin
ATTORNEYS

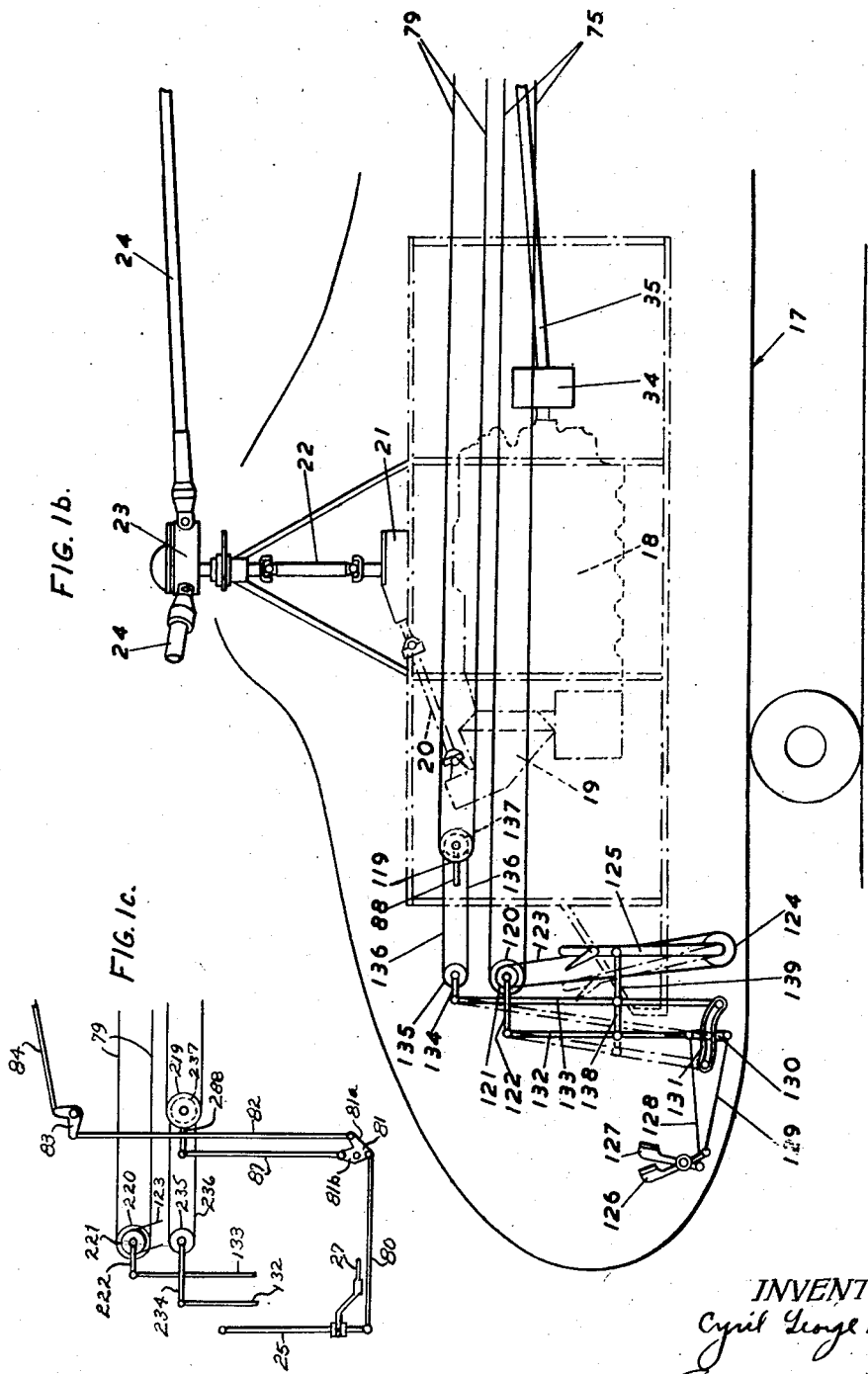

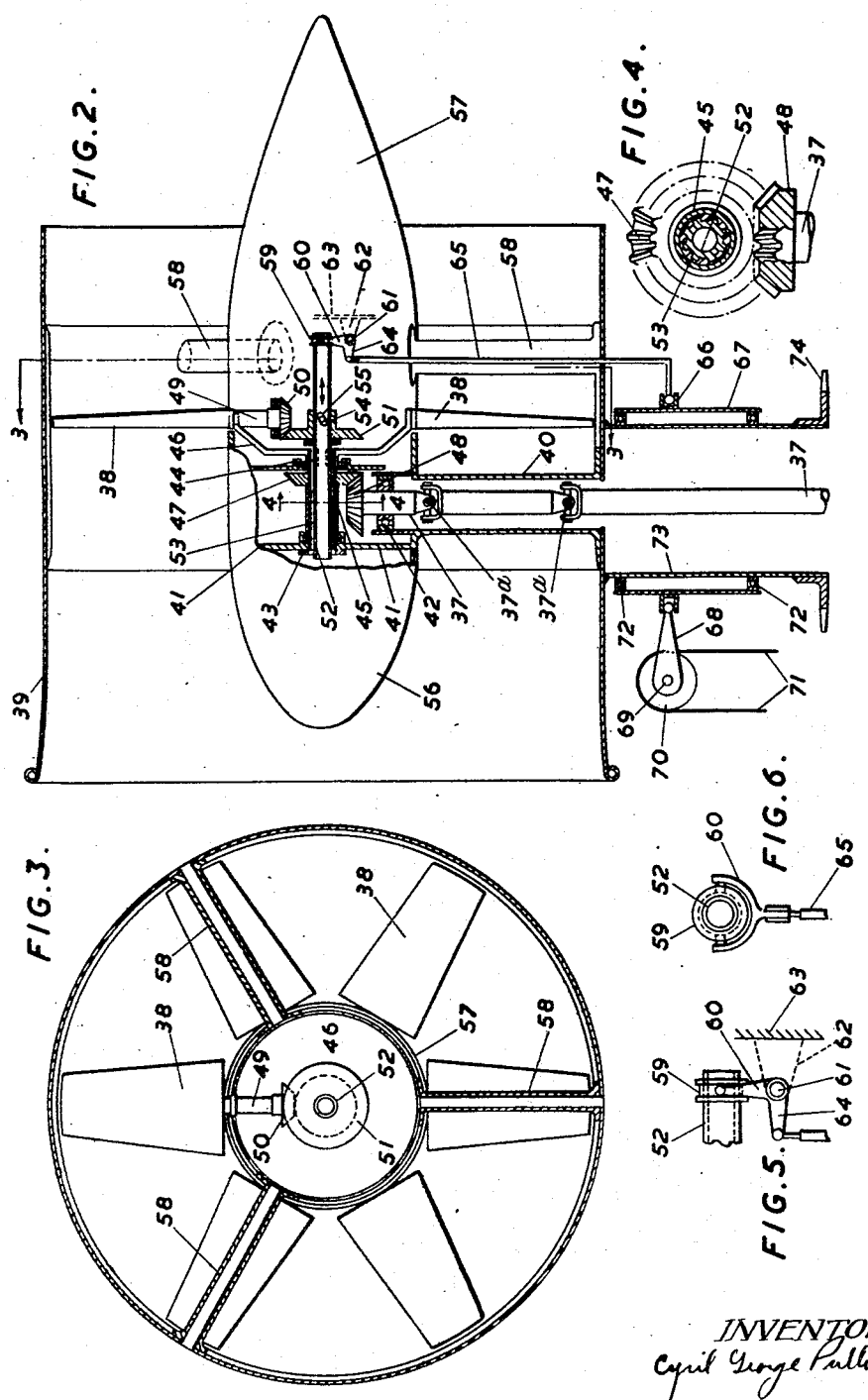

Dec. 28, 1954  C. G. PULLIN  2,698,059
HELICOPTER CONTROL SYSTEM
Filed July 8, 1953  5 Sheets—Sheet 5

INVENTOR
Cyril George Pullin
ATTORNEYS

United States Patent Office 2,698,059
Patented Dec. 28, 1954

2,698,059

HELICOPTER CONTROL SYSTEM

Cyril George Pullin, Moseley, Birmingham, England, assignor to Autogiro Company of America, a corporation of Delaware Application July 8, 1953, Serial No. 366,707
In Great Britain September 27, 1945

Section 1, Public Law 690, August 8, 1946
Patent expires September 27, 1965

9 Claims. (Cl. 170—135.22)

This application is a continuation-in-part of my U. S. application Serial No. 714,988, filed December 9, 1946.

This invention relates to helicopters of the kind provided with an auxiliary rotor producing a horizontal thrust, situated at a distance from the aircraft C. G. on the fore and aft center line, its thrust being utilized for compensating the torque-reaction of the main lifting rotor system.

I have found that the overall efficiency of a helicopter of this kind can be improved at the high-speed end of the forward speed range if the auxiliary rotor can be made to contribute substantially to the propulsion of the aircraft and its propulsive thrust is progressively increased as the speed is increased; in the medium and low-speed parts of the speed range the best efficiency is obtained by relying entirely on the main rotor system for propulsion as well as sustentation, the auxiliary rotor being used solely for torque-reaction compensation and yawing control. The transition between the "medium speed" and "high-speed" parts of the speed range, being the speed at which it becomes advantageous to begin obtaining propulsive thrust from the auxiliary rotor will depend on various design parameters of individual aircraft; it is not in general very critical, but usually lies nearer the upper limit of the design speed range than the lower limit (which is zero).

The main object of the invention is to provide means for ensuring the above-mentioned desirable results in a semi-automatic manner, with the addition of as few as possible independently manipulated controls.

Since, below the "transition" speed forward thrust is obtained from the main lifting rotor system, the controls of the latter must provide for a progressively increasing forward component of the lift reaction as the control is manipulated for increasing speed, in the usual manner; but above the transition speed, in so far as the increase of forward thrust required with increasing speed is obtained from the auxiliary rotor the need for increased horizontal thrust from the main lifting rotor system is reduced.

A further object of the invention is the provision of means for meeting this requirement. It is also to be noted that, since angular displacement of the lift vector to obtain a horizontal propulsive component entails change of aircraft attitude in the pitching plane, any reduction of the horizontal propulsive component of the lift which can be achieved by transferring the propulsive function, at least in part, to the auxiliary rotor will entail a corresponding reduction of the change of aircraft attitude, which is advantageous; and this advantage will become especially great at the high-speed end of the speed range, since the horizontal thrust required to overcome parasitic drag then becomes really considerable, and progressively so with increasing speed.

According to this invention, in a helicopter having a lifting rotor system with means for controllably displacing the lift vector in the pitching plane of the aircraft and an auxiliary rotor producing a horizontal thrust, located at a distance from the aircraft C. G. on the fore and aft centre line and having means for controllably varying the magnitude and direction of its thrust enabling it to be used for compensating the torque-reaction of the lifting rotor system and for assisting in the propulsion of the aircraft in forward flight, the control means of the auxiliary rotor and the pitching control means of the lifting rotor system are so interconnected that the thrust of the auxiliary rotor, or its propulsive component, is increased progressively as the pitching control member is displaced in the direction for increasing forward speed, at least in respect of a part of the displacement range of the control member lying between a position intermediate the limits of its travel and the limit of its travel in the said direction.

According to a feature of the invention, the pitching control means of the sustaining rotor system is so constructed and operative that the ratio of lift vector displacement to control member displacement varies with control member position, being smaller for control member positions at and near the "nose-down" (or high-speed) limiting position and greater for positions at or near the other limiting position, so that substantial increase of the propulsive thrust of the auxiliary rotor is accompanied by decreased effectiveness of lift vector displacement control.

The auxiliary rotor may be of the usual screw-propeller type with variable pitch blades, and with its axis of rotation substantially horizontal.

The magnitude of the thrust of a screw-propeller type auxiliary rotor can be varied by varying the pitch of the blades and the direction of thrust can be changed by orientating the auxiliary rotor about a vertical pivot axis. To obtain a transverse thrust from the auxiliary rotor for compensating the torque-reaction of the lifting rotor system at zero forward speed, the auxiliary rotor must be set with its axis substantially transverse of the aircraft, whereas when the thrust of the auxiliary rotor is required to contribute to propulsion of the aircraft, its axis must be set substantially fore and aft, but with a lateral bias in the appropriate direction for compensating the lifting-rotor torque-reaction. When the auxiliary rotor is set in the transverse position the aircraft may be controlled in yaw by varying the magnitude of the auxiliary rotor thrust, whereas when the auxiliary rotor is in the propulsive position, yawing control of the aircraft may be effected by orientating the auxiliary rotor to deflect its axis to either side of its neutral position. The requirements to which the pitch of the auxiliary rotor must conform, if possible, differ according to whether its axis is transverse or substantially fore and aft. Thus in the transverse position the pitch is required to remain substantially constant to provide substantial constancy of torque-reaction compensating moment and substantially constant response to control in yaw; and the appropriate pitch will be fairly small, since there is no axial relative wind. With the auxiliary rotor in the propulsive position, its pitch must be coarsed progressively as forward speed increases to maintain positive angle of attack of the blades and positive propulsive thrust, as the advance per revolution increases, and progressive increase of propulsive thrust calls for more pronounced coarsening of the pitch. Hence, if the auxiliary rotor is to be re-orientated from the transverse to the propulsive position at any forward-speed intermediate between zero and "all-out level" speed, the pitch appropriate to the propulsive position at this speed will in general be coarser than that appropriate to the transverse position; and the more so the higher is the speed at which re-orientation is effected. It is therefore desirable that re-orientation of the auxiliary rotor from transverse to propulsive position be accompanied by an abrupt coarsening of the pitch.

The objects of the invention include the provision of means for obtaining these functional effects without introducing more than one independently manipulated control.

According to a feature of the invention applicable to a helicopter with an auxiliary rotor of the orientatable variable-pitch screw-propeller type as described above, independent mechanisms are provided for orientating the auxiliary rotor and for varying its pitch respectively, the latter mechanism being so coupled to the pitching control means of the lifting rotor system, that the pitch of the auxiliary rotor, is dependent on the position of the pitching control member and is progressively coarsened by displacement of said member in the "nose-down" direction, at least between some intermediate position and the "nose-down" limiting position, and the orientating mechanism having an independent control member which can be manipulated for changing the direction of the axis of the auxiliary rotor from transverse of the aircraft to approximately fore and aft. Further, the last named member may be coupled to the pitch varying mechanism of the auxiliary rotor, so that on re-orientating of the latter from the transverse to the propulsive position its pitch is coarsened by a definite amount.

In this form of construction the mechanisms for orientating the auxiliary rotor and for varying its pitch, are preferably each connected with a common control member for controlling the aircraft in yaw through shiftable coupling elements, such as "link-motion" devices, so controlled by the independent control member that operates the orientating mechanism that the yawing control member is effectively coupled to the pitch varying mechanism only when the direction of the auxiliary rotor axis is transverse, and is effectively coupled to the orientating mechanism only when the general direction of said axis is approximately fore and aft.

Additional objects of the invention include the provision of appropriate control and other mechanisms for the sustaining and auxiliary rotor systems, whereby the foregoing advantages and functional results may be obtained.

How these several and various objects may be achieved will appear in the following description, with reference to the accompanying drawings, of a specific example of the invention as embodied in a helicopter with a single sustaining rotor and an auxiliary rotor mounted at the tail of the aircraft, both being driven by the same motor through constant ratio gearing giving an invariable speed ratio between the sustaining and auxiliary rotors. The invention is, of course, not limited to the arrangements, constructions and details actually illustrated in the drawings and described with reference to them, but such modifications and variations may be made as may be deemed advisable by those skilled in the art, within the scope of the invention as defined in the appending claims.

In the drawings:

Figs. 1, 1a and 1b together constitute a general arrangement view in side elevation of a helicopter embodying one form of the invention, Fig. 1 showing the rear portion of the helicopter and Figs. 1a and 1b showing the forward portions; Figs. 1a and 1b are duplicates, except that for clearness certain parts are omitted in Fig. 1a and certain other parts in Fig. 1b;

Fig. 2 is a central vertical axial section of the auxiliary rotor on an enlarged scale;

Fig. 3 is a sectional view taken along the line 3—3 of Fig. 2;

Fig. 4 is a detail sectional view taken along the line 4—4 of Fig. 2;

Fig. 5 is an enlargement of a detail of Fig. 2;

Fig. 6 shows a detail of Fig. 5 on the same scale, as viewed in a direction perpendicular to that of Fig. 5;

Fig. 10 is a detail view of a modification of part of the showing of Fig. 1a.

Figure 1:
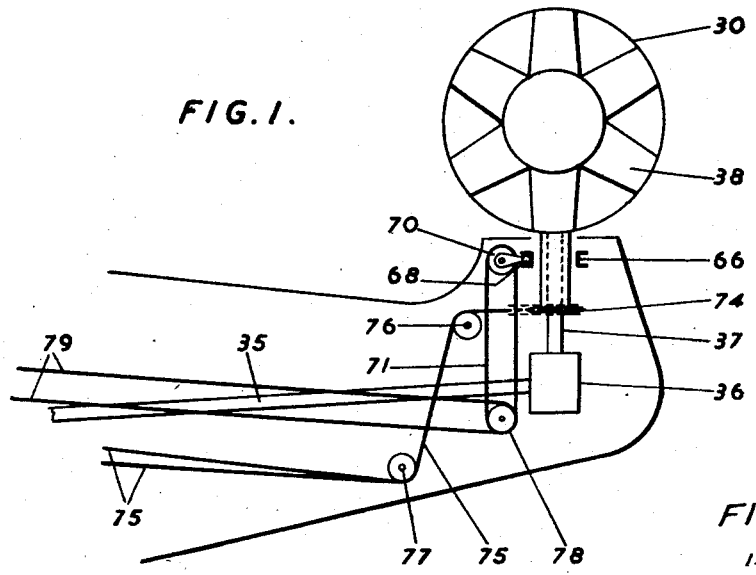
Fig. 1c is an alternative form of the invention showing portions of the control linkages.
Figure 1A:
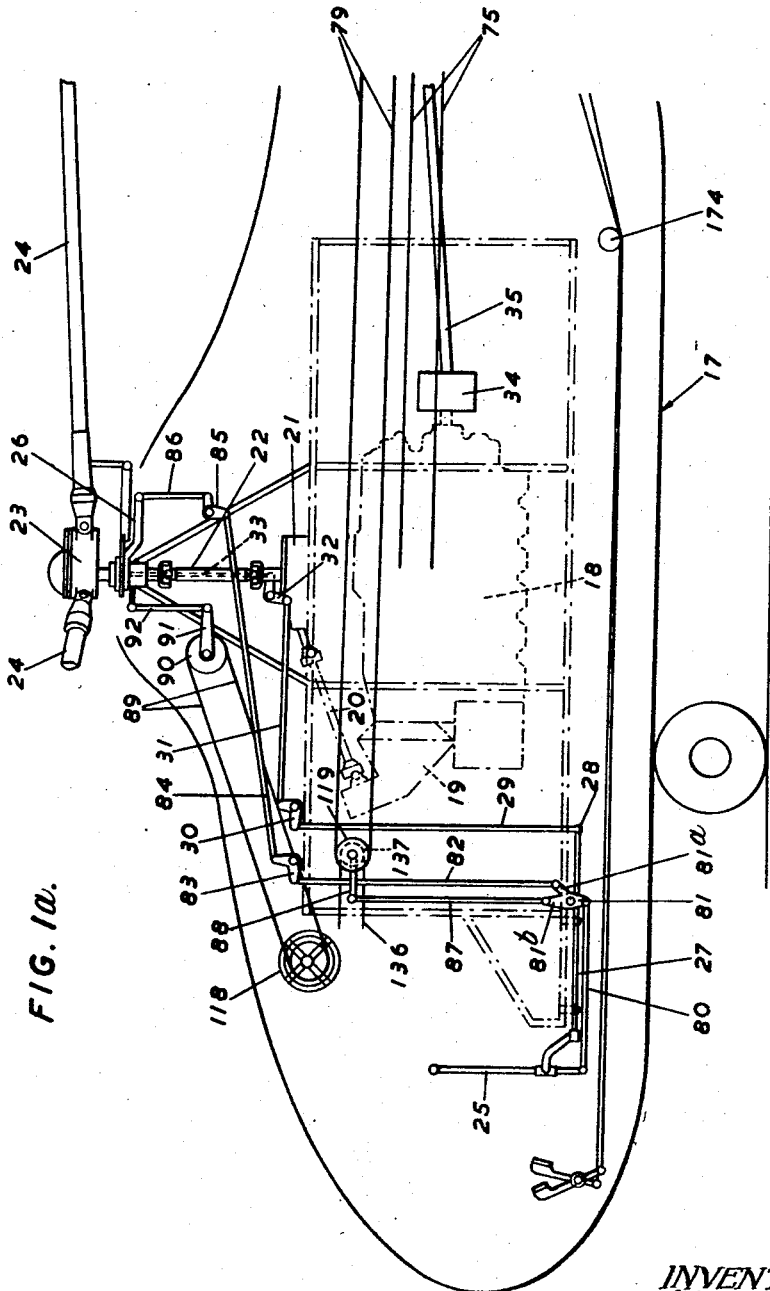

In Figs. 1, 1a and 1b the helicopter has a body 17 enclosing an engine 18, on the front of which is a main gear-box 19, from which a transmission shaft 20 is taken to a lifting-rotor reduction-gear housing 21; and an upright shaft 22 transmits the engine power from the rotor reduction gear to the lifting-rotor hub 23 carrying rotor blades 24.

Pitching displacement of a conventional control column 25 operates a pitching control linkage hereinafter described, connected to a fore-and-aft lever 26 of a swash-plate mechanism for applying so-called cyclic pitch control to the lifting rotor blades. Similarly a rolling control linkage, operated by rolling displacement of the control column and comprising a torque tube 27, crank 28, push-pull rods 29, 31, 33 and bell-cranks 30, 32 is connected to a transverse lever 117 of the swash-plate mechanism (see Fig. 8).

On the rear of the engine is an auxiliary gear-and-clutch housing 34 from which a transmission shaft 35 is taken to an auxiliary rotor reduction-gearbox 36; and from this the drive is tranmitted to the auxiliary rotor through upright transmission shafting 37 and further gearing shown in Fig. 2. The blading 38 of the auxiliary rotor rotates within a duct or shroud 39.

In the auxiliary rotor installation, as shown in Figs. 2 to 6, the auxiliary rotor and its driving gears and pitch-varying mechanism are carried on a tubular support 40, which, together with a casing 41 carrying a leading fairing 56, forms a unitary structure with the duct or shroud 39; this unitary structure also includes tubular radial struts 58 of streamline section supporting a trailing fairing structure 57, the auxiliary rotor itself being situated between the leading and trailing fairings 56, 57. The tubular support 40 encloses the transmission shafting 37, which includes two universal joints 37a, and supports the upper end of the shafting in a bearing 42.

The auxiliary rotor itself comprises a hollow shaft 45 supported by the casing 41 in bearings 43, 44 and a hub member in the form of a dished plate 46 fast on shaft 45 and having bearings in its rim in which the shanks 49 of the rotor blades 38 are journalled. The drive is transmitted to the shaft 45 through a bevel gear 47 fast thereon which meshes with a bevel gear 48 fast on the shafting 37 (see Fig. 4).

For varying the auxiliary rotor pitch, each blade shank 49 carries a bevel pinion 50 meshing with a crown bevel wheel 51, which is common to all the blades and is loose on a shaft 52 which can slide axially within the shaft 45 on a splined joint 53 (see Fig. 4). The crown wheel 51 has internally projecting pins 55 engaging helically disposed slots 54 in the shaft 52, causing the crown wheel to rotate relatively to the shaft 52 when the latter is axially displaced; and since shaft 52 is splined to shaft 45 this rotation of the crown wheel 51 is also relative to the hub plate 46 and therefore causes the pinions 50 to turn and change the pitch of the blades 38.

Axial shifting of shaft 52 is effected by a striking fork 60 engaging a thrust collar 59 fast on shaft 52; the fork 60 is pivoted at 61 on a bracket 62 carried by a diaphragm 63 forming part of the fairing structure 57 and is provided with a lever 64 connected to a push-pull rod 65 housed within one of the hollow struts 58 (see Figs. 5 and 6).

The duct or shroud unit 39, 40, 41, 56, 57, 58 is supported rigidly on a tubular member 73 which encloses the shafting 37 and is supported by bearings 72 in a fixed tubular housing 67 forming part of the airframe; the whole auxiliary rotor installation can turn about a vertical axis on the bearings 72. On the outside of the housing 67 a grooved collar 66 can slide vertically and is engaged by the lower end of the push-pull rod 65 and by a lever 68 whose shaft 69 carries a pulley 70 over which an endless cable 71 is passed. Movement of this cable rocks lever 68 and shifts the collar 66 axially on the tubular housing 67 to operate the push-pull rod 65 and thereby vary the pitch of the auxiliary rotor. The endless cable 71 is led over one member of a double pulley 78, over whose other member is led a cable 79 the ends of which are led forward to the fore part of the aircraft (see Figs. 1 and 1a).

The lower end of the tubular member 73 is provided with a sprocket 74 engaged by a chain section inserted in a control cable 75, which is led over jockey pulleys 76, 77 to the fore part of the aircraft. Movement of cable 75 rotates the whole auxiliary rotor installation on its bearings 72.

Figure 7:
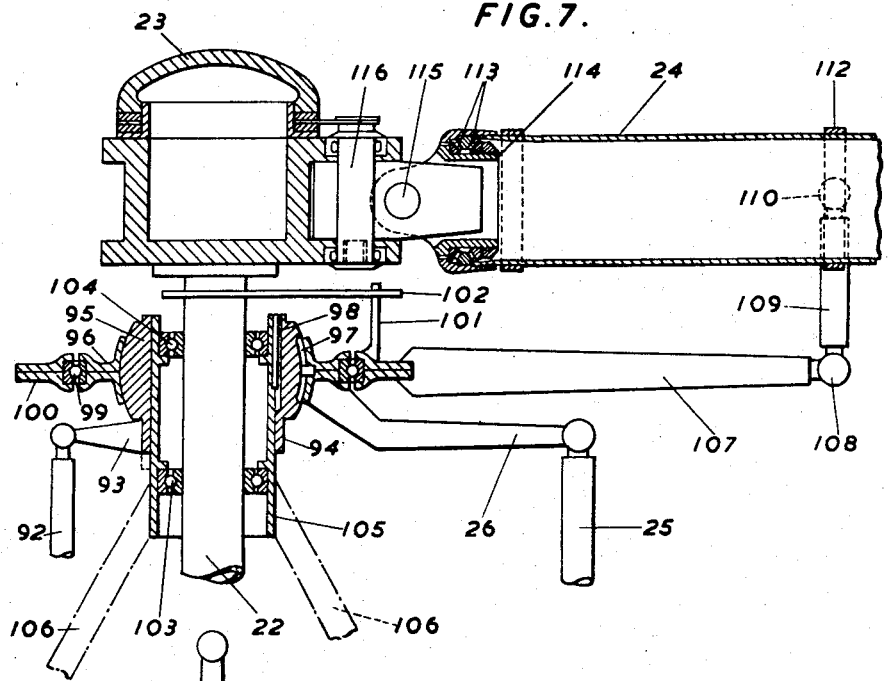
Fig. 7 is a central axial section on an enlarged scale of the lifting rotor hub and blade articulation.
Figure 8:
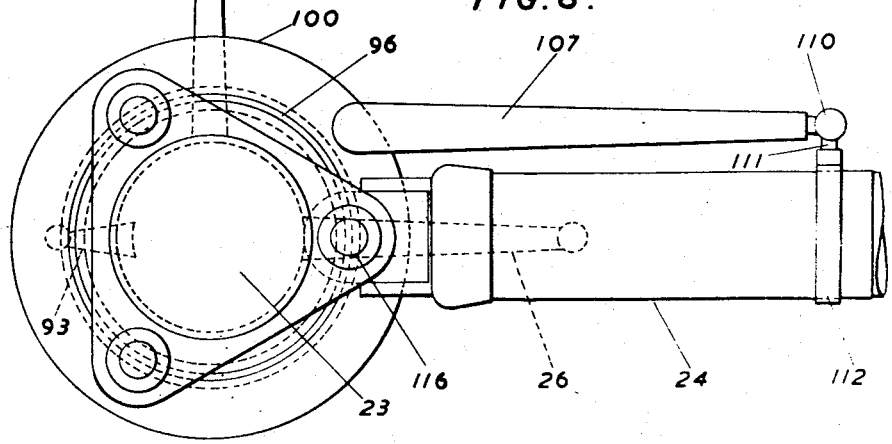
Fig. 8 is a plan view of the parts shown in Fig. 7, to the same scale.

The elements of the lifting rotor shown in Figs. 7 and 8 comprise the driving shaft 22 and the hub 23 on which blade root stubs 114 are articulated by drag pivots 116 and flapping pivots 115; and the blades 24 are supported by the stubs 114 on torsional or blade-pitch-varying bearings 113. The driving shaft 22 is integral with the hub 23 and is supported in bearings 103, 104 by a cylindrical housing 105 secured to a pylon structure 106.

Pitch variation of the rotor blades, both "mean" and "cyclic," is effected by a swash-plate mechanism comprising a collar 94, which slides on the outside of the housing 105, being prevented from rotating by a splined connection 98, and which has a male spherical surface 95 engaged by a corresponding female spherical surface of a non-rotating swash-plate member 96, the latter being prevented from rotating by a pin-and-slot connection 97. The member 96 carries a rotary swash-plate ring 100 on a bearing 99 and the ring 100 is rotated by shaft 22 through a connection conventionally represented by an arm 101 integral with the ring 100 engaged by an arm 102 rigid with the shaft 22. Arms 107 projecting from the ring 100 are connected with arms 111, secured to the blades 24 by straps 112, through links 109 with ball-joints 108, 110 at each end.

"Cyclic" pitch variation is effected by the arms 26 and 117 connected to the pitching and rolling control circuits respectively, these arms 26 and 117 being rigid with the non-rotary swash-plate member 96.

Variation of the "mean" rotor-blade-pitch angle is effected by shifting the collar 94 vertically on the cylindrical housing 105, for which purpose the collar 94 is provided with a rigid arm 93 connection through a universal joint with a push-pull rod 92.

The control circuit operating the arm 93 is shown in Fig. 1a and comprises the rod 92, a lever 91 connected to rod 92, and an endless cable 89 passing over a pulley 90 fast on the shaft of lever 91 and over a cable drum formed on a handwheel 118.

Reverting to Fig. 1a, the pitching control circuit which operates the swash-plate arm 26 for tilting the swash-plate 96, 100 in the pitching plane, and thereby applying "cyclic" pitch control in the pitching plane, comprises push-pull rods 82, 84, 86 and bell-cranks 83, 85. This control circuit is connected to one arm 81a of a three-armed bell crank 81, 81a, 81b, to whose lower arm 81 fore and aft motion of the control column 25 is transmitted by a push-pull rod 80.

The third arm 81b of the bell-crank 81, 81a, 81b is connected by a push-pull rod 87 with a lever 88, which operates a pulley 119 through a differential gear, hereinafter described. The pulley 119 carries the cable 79, previously mentioned, which operates the variable pitch mechanism of the auxiliary rotor.

The mutual relationship of the crank arms 81, 81a, 81b, is such that when the control column is in a rearward position appropriate to hovering the arm 81b is dead-centered and movement of the control column has no effect on the pitch of the auxiliary rotor, but the arm 81a is fully effective in operating the fore and aft cyclic pitch control; whereas when the control column is fully forward the arm 81a is dead-centered and the arm 81b fully effective. Therefore as the control column is displaced forwardly, the ratio of swash-plate displacement in the pitching plane to control member displacement progressively decreases and the ratio of auxiliary rotor pitch change to control member displacement increases progressively. The connection to the auxiliary rotor variable pitch mechanism is so made that the auxiliary rotor pitch is coarsened as the control column is displaced forwardly and the control circuits are so proportioned that the auxiliary rotor pitch is coarsened sufficiently as the control column approaches its fully forward position to cause the propulsive thrust of the auxiliary rotor to increase progressively, it being postulated that the auxiliary rotor has been orientated (by the mechanism hereinafter described) into the propulsive position with its axis fore and aft.

Referring to Fig. 1b, the cable 75 which operates the sprocket 74 for orientating the auxiliary rotor assembly on its vertical pivot bearings 72 as previously described is led over a pulley 120 which can be differentially operated by a pulley 121 and by a lever 122. Pulley 121 is connected by an endless cable 123 with a pulley 124 on the shaft of a lever 125. Displacement of lever 125 from its rearmost to its foremost position, with lever 122 stationary rotates the auxiliary rotor assembly from a position in which its axis is transverse (its thrust being in the appropriate direction for compensating the lifting-rotor torque-reaction) through rather less than 90° to a position in which its axis is nearly fore and aft (its thrust being in the propulsive direction but having a lateral component in the torque-reaction compensating direction).

Figure 11:
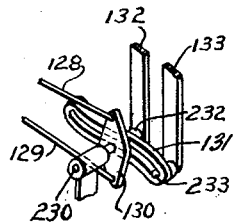
Fig. 11 is an enlarged perspective view of a portion of the control mechanism shown in Fig. 1b.

Yawing control is effected by conventional rudder pedals 126, 127 coupled by ties 128, 129 with a lever 130, also shown in Fig. 11, which rocks on a horizontal transverse pivot 230 and carries a slotted beam 131. The center of the slot lies on the axis of the pivot on which the lever 130 is mounted. There are two push-pull rods 132, 133, whose lower ends have pins 232 and 233 engaging in the slot of the beam 131 and whose upper ends are respectively connected to lever 122, already mentioned, and to a lever 134 on whose shaft is a pulley 135 connected by an endless cable 136 with a pulley 137.

Pulley 137 acts on the pulley 119 and cable 79 operating the variable pitch mechanism of the auxiliary rotor through the differential gear previously mentioned in connection with lever 88; and lever 122 acts on the pulley 120 and cable 75 operating the sprocket 74 which orientates the auxiliary rotor.

The rods 132, 133 are also connected by pin jointed links 138, 139 with the lever 125 so that shifting of the latter causes the pins at the lower ends of rods 132, 133 to travel along the slot of the beam 131. When the lever 125 is in the rearward position and the auxiliary rotor axis is transverse, the parts are in the positions shown in full lines, in which rod 132 is dead-centered and ineffective while rod 133 is at the rear end of slot 131, and fully effective. Motion of the rudder pedals is therefore transmitted through rod 133, lever 134 and pulleys 135, 137 to pulley 119 and cable 79 for varying the pitch of the auxiliary rotor, thereby varying its transverse thrust. When the lever 125 is moved to the forward position to bring the auxiliary rotor into the propulsive position, the lower end of rod 133 is moved along one half of the slot of the beam 131, which is so shaped that the rod 133 is displaced lengthwise to displace lever 134, pulleys 135, 137 and 119, and cable 79 to coarsen the pitch of the auxiliary rotor sufficiently to ensure that its thrust is positive when it is operating in an axial relative wind corresponding to the "transition" forward speed, previously mentioned, as determined for the individual design. When the lever 125 is fully forward, the lower end of rod 133 coincides with the pivot of lever 130, so that rod 133 is dead-centered and ineffective to transmit displacements of the rudder pedals. At the same time, the displacement of lever 125 has shifted the lower end of rod 132 along the other half of the slot of beam 131, which is so shaped as not to cause any lengthwise displacement of the rod 132, to the forward end of the slot so that it is now fully effective to transmit displacements of the rudder pedals to lever 122 and thence to pulley 120 and cable 75 for swinging the auxiliary rotor on its vertical pivot to port or starboard of its neutral position. The positions of the parts when the lever 125 is fully forward are shown in chain-dotted lines.

Figure 9:
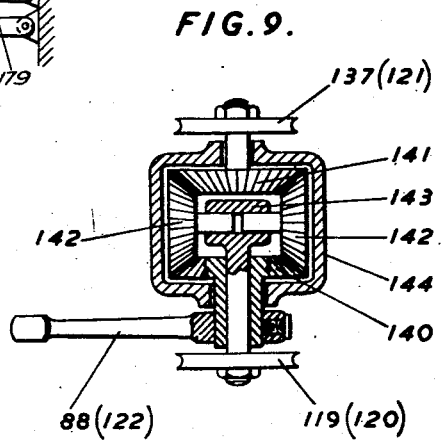
Fig. 9 is a sectional elevation of a detail of Fig. 1b.

The differential mechanisms connecting lever 88 and pulley 137 with pulley 119 and connecting lever 122 and pulley 121 with pulley 120 respectively are of the same type and are illustrated in Fig. 9, which serves for both differential mechanisms. The lever 88 (or 122) is fast on a sun wheel 140 and the pulley 137 (or 121) is fast on a sun wheel 141. These sun wheels engage planet wheels 142 carried in a cage 143 on which the pulley 119 (or 120) is mounted. The gear is supported in a fixed housing 144.

This mechanism enables pulley 119 (or 120) to be operated either by pulley 137 (or 121) or by lever 88 (or 122), the effects of the two operating members 88 and 137 (or 122 and 121) being in each case additive and independent. It will therefore be evident that the pitch of the auxiliary rotor is controlled additively by pulley 137, whose position depends on that of lever 125 when the rudder pedals are in the neutral position, and by lever 88, whose position depends only on that of the control column. Displacement of lever 125 through its full travel, to bring the auxiliary rotor from the transverse to the propulsive position, therefore coarsens the pitch of the auxiliay rotor by a definite amount, irrespective of the value of the pitch as determined by the position of the control column, and with the lever 125 in the forward position the pitch of the auxiliary rotor is uniquely dependent on the control column position, so that the position of the control column at the instant when the lever 125 is moved forward does not vary the subsequent relationship between control column position and auxiliary rotor pitch.

Figure 10:
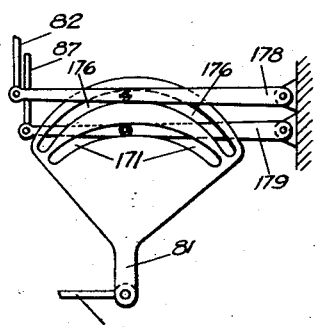

The device for transferring the action of the control column in the pitching plane from the cyclic pitch control circuit to the control circuit of the auxiliary-rotor variable-pitch mechanism, consisting of the three-armed crank 81, 81a, 81b has the merit of simplicity, but cannot give the optimum variation of auxiliary-rotor propulsive thrust and of cyclic pitch control response throughout the forward speed range. This may be obtained by means of a modified type of control circuit inter-connection, as illustrated in Fig. 10, in which the crank arms 81a, 81b are replaced by a cam-plate having a pair of cam-tracks 176, 177 which respectively operate rod 82 and rod 87 through follower-rockers 178, 179.

In this mechanism the cam profiles are so selected that over the rearward part of the range of travel of the control column, corresponding to forward speeds below the "transition" speed previously mentioned, the auxiliary rotor pitch is kept substantially constant at the value appropriate for torque-reaction compensation with the auxiliary rotor in the transverse position, while the pitching control circuit of the rotor is displaced so as to maintain the cyclic pitch response substantially constant at its maximum value; whereas over the "high-speed" part of the forward speed range, above the transition speed, i. e. over the forward part of the range of travel of the control column, the pitch of the auxiliary rotor, is increased steeply to a maximum at the extreme forward position of the control column, and the rate of displacement of the pitching control circuit of the rotor, and therefore the cyclic pitch control response, is much reduced.

Fig. 1c illustrates an alternative form of the invention in which the pitching control column is coupled with the mechanism for applying so-called cyclic pitch control to the lifting rotor blades and also with the mechanism for varying the propulsive component of the auxiliary rotor by changing the orientation thereof and so that the propulsive component is increased progressively as the pitching control member is displaced in the direction for increasing forward speed, at least with respect to a part of the displacement range of the control member lying between a position intermediate the limits of its travel in the said direction.

Referring to Fig. 1c, the control column 25, is connected with the pitching control circuit of the main rotor through linkages 80, 81, 81a, 82, 83, 84, etc., in the manner heretofore described in connection with Fig. 1a. However, in embodiment shown in Fig. 1c, the third arm 81b of the bell crank 81, 81a, 81b is connected by a push-pull rod 87, with a lever 288, which operates a pulley of differential mechanism 219 of the type shown in Fig. 9. The pulley 219 carries cable 75 which operates the orientation mechanism of the auxiliary rotor in the manner heretofore described.

In the embodiment illustrated in Fig. 1c, the variable pitch mechanism of the auxiliary rotor which is connected with cable 79 can be actuated by either the foot pedals 126, 127 or the lever 125 in a manner similar to the embodiment illustrated in Fig. 1a and Fig. 1b. However as indicated in Fig. 1c, the endless cable 123 from lever 125 is connected with a pulley 221 of the differential mechanism of the type shown in Fig. 9, and the rod 133 operated by foot pedals 126, 127 is connected to lever 222 of the differential mechanism. Pulley 220 of that mechanism operates the cable 79.

The orientation mechanism of the auxiliary rotor in the system depicted in Fig. 1c, and which is connected with cable system 75, can be operated either independently of or concurrently with the auxiliary rotor pitch varying mechanism through the rod 132, in the manner described in Fig. 1b; but, as shown in Fig. 1c, the rod 132 is connected to lever 234, pulley 235, endless cable 236, which passes over pulley 237 of the differential pulley mechanism heretofore described, pulley 219 thereof operating the cable 75.

What I claim is:

1. In a helicopter, a lifting rotor system with pitching control means, including a pitching control member, for controllably displacing the lift vector in the pitching plane of the aircraft and an auxiliary rotor producing a horizontal thrust, located at a distance from the aircraft C. G. on the fore and aft center line and having means for controllably varying the magnitude and direction of its thrust enabling it to be used for compensating the torque-reaction of the lifting rotor system and for assisting in the propulsion of the aircraft in forward flight, and in which the control means of the auxiliary rotor and the pitching control means of the lifting rotor system are so interconnected that the forward component of the thrust of the auxiliary rotor is increased progressively as the pitching control member is displaced in the direction for increasing forward speed, at least in respect of a part of the displacement range of the control member lying between a position intermediate the limits of its travel and the limit of its travel in the said direction.

2. In a helicopter, a lifting rotor system with pitching control means, including a pitching control member, for controllably displacing the lift vector in the pitching plane of the aircraft and an auxiliary rotor of the variable pitch screw-propeller type whose rotational axis is substantially horizontal and is orientatable about a vertical axis, said helicopter having independent mechanisms for orientating the auxiliary rotor and for varying its pitch respectively, the latter mechanism being so coupled to the pitching control means of the lifting rotor system that the pitch of the auxiliary rotor is dependent on the position of the pitching control member and is progressively coarsened by displacement of said member in the "nose-down" direction, at least between some intermediate position and the "nose-down" limiting position, and the orientating mechanism having an independent control member which can be manipulated for changing the direction of the axis of the auxiliary rotor from transverse of the aircraft to approximately fore and aft.

3. A construction as claimed in claim 2, in which the independent control member operating mechanism for orientating the auxiliary rotor is also coupled to the mechanism for varying its pitch so that on re-orientation of the auxiliary rotor axis from a transverse to an approximately fore and aft position the pitch of the auxiliary rotor is coarsened by a definite amount.

4. In a helicopter, a lifting rotor system with means for controllably displacing the lift vector of the lifting rotor system in the pitching plane of the aircraft and an auxiliary rotor producing a horizontal thrust and having means for controllably varying the magnitude and direction of its thrust enabling it to be used for compensating the torque-reaction of the lifting rotor system and for assisting in the propulsion of the aircraft in forward flight, and means interconnecting the control means for the lifting rotor and the control means for the auxiliary rotor and providing for increase in the propulsive component of the thrust of the auxiliary rotor concurrently with displacement of the lift vector of the lifting rotor in the direction for increasing forward speed of the aircraft.

5. A construction as in claim 1 in which said pitching control means further includes mechanism inter-connecting the pitching control member and the means for displacing the lift vector in the pitching plane, said mechanism providing for different displacement ratios between the lift vector displacement and the pitching control member displacement dependent on the position of the pitching control member, said displacement ratio being greater when the pitching control member is in position at and near the "nose down" (high speed) limiting position, and said displacement ratio being less on displacement of the pitching control member at and near the low speed limiting position of said pitching control member.

6. A construction as in claim 2 in which the mechanisms for orienting the auxiliary rotor and its horizontal thrust component about a vertical axis and for varying the pitch of the auxiliary rotor are each further connected with an independent common yaw control member by a shiftable coupling element having at least two operational positions one of which positions effectively couples the pitch control mechanism and the yaw control member only when the auxiliary rotor is so oriented that its direction of thrust is approximately transverse and another operational position which effectively couples the orienting mechanism and the yaw control member only when the direction of thrust of the auxiliary rotor is oriented in a direction that is approximately fore and aft.

7. In a rotary wing aircraft having a main rotor system for propulsion and sustension of the aircraft and including a rotor having its axis positioned generally vertically and an auxiliary rotor system offset from the center of gravity of the aircraft and including a rotor having its axis positioned generally horizontally so as to produce a horizontal thrust, a control system which comprises control means, including a pitching control member, for displacing the lift vector of the main rotor system in the pitching plane of the aircraft, orientation mechanism to vary the direction of the horizontal thrust produced by the auxiliary rotor system, means interconnecting said orientation mechanism and the pitching control means and which provide for actuation of the orientation mechanism by displacement of the pitching control member in the sense that the orientation mechanism shifts the direction of horizontal thrust of the auxiliary rotor system concurrently with the displacement of the lift vector of the main rotor system, the sense of shift being such that when the lift vector of the main rotor system is displaced in a direction to increase the translational thrust component thereof, the direction of horizontal thrust of the auxiliary rotor system is shifted to increase its propulsive effect on the aircraft.

8. A construction according to claim 7 in which the means interconnecting the orientation mechanism and the pitching control means further includes means for defining an effective range within which actuation of said orientation mechanism will occur when the pitching control member is displaced, said effective range being dependent upon displacement of the lift vector of the main rotor in the pitching plane beyond a predetermined mid range of adjustment.

9. A construction according to claim 7 in which the means interconnecting the pitch control means and the orientation mechanism further include means for varying the relative rates of displacement of the lift vector of the lifting rotor system and the change in direction of the horizontal thrust produced by the auxiliary rotor system upon displacement of the pitching control member, said relative rates of displacement being dependent on the position of the lift vector of the main rotor in its displacement range.

References Cited in the file of this patent

UNITED STATES PATENTS

| Number | Name | Date |
|---|---|---|
| 1,548,686 | Hoback et al. | Aug. 4, 1925 |
| 1,783,011 | Florine | Nov. 25, 1930 |
| 2,381,417 | Adams | Aug. 7, 1945 |
| 2,385,889 | Skavinsky | Oct. 2, 1945 |
| 2,427,982 | Trotter | Sept. 23, 1947 |
| 2,445,354 | Hoppes | July 20, 1948 |
| 2,496,624 | Heintze | Feb. 7, 1950 |

FOREIGN PATENTS

| Number | Country | Date |
|---|---|---|
| 155,974 | Switzerland | Oct. 1, 1932 |